(12) United States Patent
Narasimhan et al.

(10) Patent No.: US 9,084,111 B2
(45) Date of Patent: Jul. 14, 2015

(54) SYSTEM AND METHOD FOR DETERMINING LEVELED SECURITY KEY HOLDER

(75) Inventors: Partha Narasimhan, Saratoga, CA (US); Venkatesh Joshi, Bangalore (IN); Juei-Cheng Lo, Los Altos, CA (US)

(73) Assignee: ARUBA NETWORKS, INC., Sunnyvale, CA (US)

( * ) Notice: Subject to any disclaimer, the term of this patent is extended or adjusted under 35 U.S.C. 154(b) by 247 days.

(21) Appl. No.: 13/368,212

(22) Filed: Feb. 7, 2012

(65) Prior Publication Data
US 2013/0203384 A1    Aug. 8, 2013

(51) Int. Cl.
*H04W 12/04* (2009.01)
*H04L 29/06* (2006.01)
*H04W 48/20* (2009.01)
*H04W 36/08* (2009.01)

(52) U.S. Cl.
CPC ........... *H04W 12/04* (2013.01); *H04L 63/0227* (2013.01); *H04W 48/20* (2013.01); *H04W 36/08* (2013.01)

(58) Field of Classification Search
CPC ..... H04W 12/04; H04W 12/06; H04W 88/08; H04W 36/00; H04W 48/20; H04W 36/08
USPC ............. 726/1, 2, 7; 380/247, 250, 270, 272, 380/277.278, 277, 278, 45.247; 455/436, 455/432.1, 433, 439, 435.2, 435.3, 456.1, 455/456.2, 411, 525
See application file for complete search history.

(56) References Cited

U.S. PATENT DOCUMENTS

| | | | | |
|---|---|---|---|---|
| 5,309,516 A | * | 5/1994 | Takaragi et al. | 380/45 |
| 5,661,806 A | * | 8/1997 | Nevoux et al. | 380/247 |
| 5,946,621 A | * | 8/1999 | Chheda et al. | 455/440 |
| 6,122,514 A | * | 9/2000 | Spaur et al. | 455/448 |
| 6,381,458 B1 | * | 4/2002 | Frodigh et al. | 455/442 |
| 6,950,656 B1 | * | 9/2005 | Bahk et al. | 455/436 |

(Continued)

FOREIGN PATENT DOCUMENTS

| | | | | |
|---|---|---|---|---|
| EP | 1439667 | * | 7/2004 | H04L 12/28 |
| EP | 1531645 | * | 5/2005 | H04Q 7/38 |
| WO | WO0158182 | * | 8/2001 | H04Q 7/00 |

OTHER PUBLICATIONS

Mishra et al., "Pro-active Key Distribution using Neighbor Graphs", IEEE Wireless Communications, Sep. 21, 2003, pp. 1-8.*

*Primary Examiner* — Kambiz Zand
*Assistant Examiner* — Tongoc Tran
(74) *Attorney, Agent, or Firm* — Ying Wang

(57) ABSTRACT

The present disclosure discloses a network device and/or method for determination of leveled security key holders for a wireless client in a wireless network. The network device detects a roaming or connection pattern of one or more wireless clients in the wireless network based on requests received from the wireless clients. Furthermore, the network device determines one or more selecting rules for selecting an appropriate key holder for the wireless client among a plurality of network devices. Next, the network device prioritizes the one or more selecting rules, and selects the appropriate key holder based on the determined rules and their corresponding prioritization. Through selection of appropriate key holders, the disclosed method provides for better load balancing among possible leveled key holders, and shortens the latencies experienced by wireless clients during fast basic service set transition.

19 Claims, 9 Drawing Sheets

(56) References Cited

U.S. PATENT DOCUMENTS

| | | |
|---|---|---|
| 7,065,367 B2* | 6/2006 | Michaelis et al. ......... 455/452.2 |
| 7,961,684 B2* | 6/2011 | Sood .............................. 370/331 |
| 8,238,906 B1 | 8/2012 | Oroskar et al. |
| 8,249,256 B2* | 8/2012 | Korus et al. ................... 380/272 |
| 8,433,329 B2* | 4/2013 | Grote-Hahn et al. ......... 455/450 |
| 8,504,054 B2* | 8/2013 | Jain et al. ...................... 455/453 |
| 8,627,423 B2* | 1/2014 | PalChaudhuri et al. .......... 726/6 |
| 2002/0131386 A1* | 9/2002 | Gwon .............................. 370/338 |
| 2003/0061351 A1* | 3/2003 | Prathima et al. ............... 709/226 |
| 2004/0203783 A1* | 10/2004 | Wu et al. ........................ 455/436 |
| 2004/0240412 A1* | 12/2004 | Winget .......................... 370/331 |
| 2004/0249915 A1* | 12/2004 | Russell ......................... 709/223 |
| 2007/0072587 A1* | 3/2007 | Della-Torre ................. 455/410 |
| 2007/0206537 A1 | 9/2007 | Cam-Winget et al. |
| 2007/0281712 A1* | 12/2007 | Povey et al. ................ 455/456.1 |
| 2008/0031194 A1* | 2/2008 | Yaqub ............................ 370/331 |
| 2008/0063204 A1* | 3/2008 | Braskich et al. .............. 380/270 |
| 2009/0116647 A1 | 5/2009 | Korus et al. |
| 2009/0122748 A1* | 5/2009 | Gourhant et al. ............. 370/328 |
| 2009/0170476 A1* | 7/2009 | Lin et al. ........................ 455/411 |
| 2009/0217033 A1* | 8/2009 | Costa et al. .................... 713/155 |
| 2009/0282238 A1* | 11/2009 | Bichot et al. .................. 713/155 |
| 2010/0172501 A1* | 7/2010 | Tian et al. ...................... 380/277 |
| 2010/0266130 A1* | 10/2010 | Lin et al. ........................ 380/279 |
| 2011/0230164 A1* | 9/2011 | Ophir et al. .................... 455/406 |
| 2011/0235591 A1 | 9/2011 | Iyer et al. |
| 2013/0196708 A1* | 8/2013 | Narasimhan et al. ......... 455/525 |
| 2013/0316741 A1* | 11/2013 | Frias Martinez et al. .. 455/456.5 |

* cited by examiner

SYSTEM AND METHOD FOR DETERMINING LEVELED SECURITY KEY HOLDER

RELATED APPLICATIONS

The instant application is related co-pending application entitled "Propagation of Leveled Key to Neighborhood Network Devices" by Partha Narasimhan, Venkatesh Joshi, and Juei-Cheng Lo, U.S. patent application Ser. No. 13/363,087, filed on 31 Jan. 2012, the entire contents of which are incorporated by reference herein.

FIELD

The present disclosure relates to wireless mobile device handoffs in a wireless digital network. In particular, the present disclosure relates to fast Basic Service Set (BSS) transitions (FT) mechanisms between access points in a wireless digital network.

BACKGROUND

Wireless digital networks, such as networks operating under current Electrical and Electronics Engineers (IEEE) 802.11 standards, are spreading in their popularity and availability. With such popularity, however, come problems of fast BSS transitions. A BSS transition generally refers to movement of a wireless station from one BSS in one extended service set (ESS) to another BSS within the same ESS. By contrast, a fast BSS transition (FT) generally refers to a BSS transition that establishes the state necessary for data connectivity before the re-association rather than after the re-association.

For example, the current IEEE 802.11i standard (Medium Access Control Security Enhancements) provides pre-authentication and Pairwise Master Key (PMK) caching. Pre-authentication enables supplicants, such as wireless stations, to authenticate with authenticators, such as access points or network controllers, to which they may roam. Pre-authentication typically happens through the access point to which the wireless station is currently associated over a distribution system, such as an Ethernet network. Moreover, PMK caching allows supplicants and authenticators to cache PMK Security Associations (PMKSAs) so that a supplicant revisiting an authenticator to which it has previously authenticated can omit performing IEEE 802.1X/EAP authentications and proceed directly to a 4-way handshake. The 4-way handshake is used by an IEEE 802.1X supplicant and an authenticator to derive Pairwise Transient Keys (PTKs) which are used for encrypting data frames. PMK Caching is also referred to as "fast roam-back" because supplicants must have previously authenticated and formed a PMKSA with the authenticator in order to proceed directly to the 4-way handshake.

Alternatively, an Opportunistic Key Caching (OKC) protocol can be used in fast roaming where the supplicant has never authenticated. OKC allows the PMK in the initial PMKSA formed by the supplicant and authenticator to be reused across the network. The PMK can be redistributed by a wireless local area network (WLAN) and given new PMK identifiers that are unique to each access point in the WLAN. The unique PMK identifier may include the new access point's Media Access Control (MAC) address (i.e., BSSID). According to OKC, the supplicant places the unique PMK identifier into its re-association request; and when the authenticator validates the PMK identifier, the access point starts the 4-way handshake using the PMK corresponding to the PMK identifier to derive a PTK.

Moreover, the current IEEE 802.11r standard (Fast Basic Service Set Transition) specifies an exemplary FT protocol, which redefines a security key negotiation protocol and allows the negotiation and request for wireless resources to occur in parallel. The IEEE 802.11r standard introduces, inter alia, a new 3-tier authentication and key management (AKM) architecture and two tiers of pairwise master keys (PMKs). Furthermore, mobility domain is typically a set of BSSs within the same ESS, each of which is identified by a mobility domain identifier. Fast BSS Transition (FT) can be supported between access points within a mobility domain, but is not specified between mobility domains according to the IEEE 802.11r standard. Also, an authenticator is split into two levels: a first level key holder, such as a PMK-R0 Key Holder (R0KH), and a second level key holder, such as a PMK-R1 Key Holder (R1KH).

Nevertheless, existing protocols supporting fast BSS transitions barely provide any effective and efficient ways of determining appropriate leveled security key holders during fast BSS transitions. Proper determination of leveled security key holders of first and/or second level security keys can reduce latency in completion of the fast BSS transition and provide better load balancing of clients among multiple wireless network devices (such as access points) within a mobility domain.

BRIEF DESCRIPTION OF THE DRAWINGS

The present disclosure may be best understood by referring to the following description and accompanying drawings that are used to illustrate embodiments of the present disclosure.

DETAILED DESCRIPTION

Figure 1A:
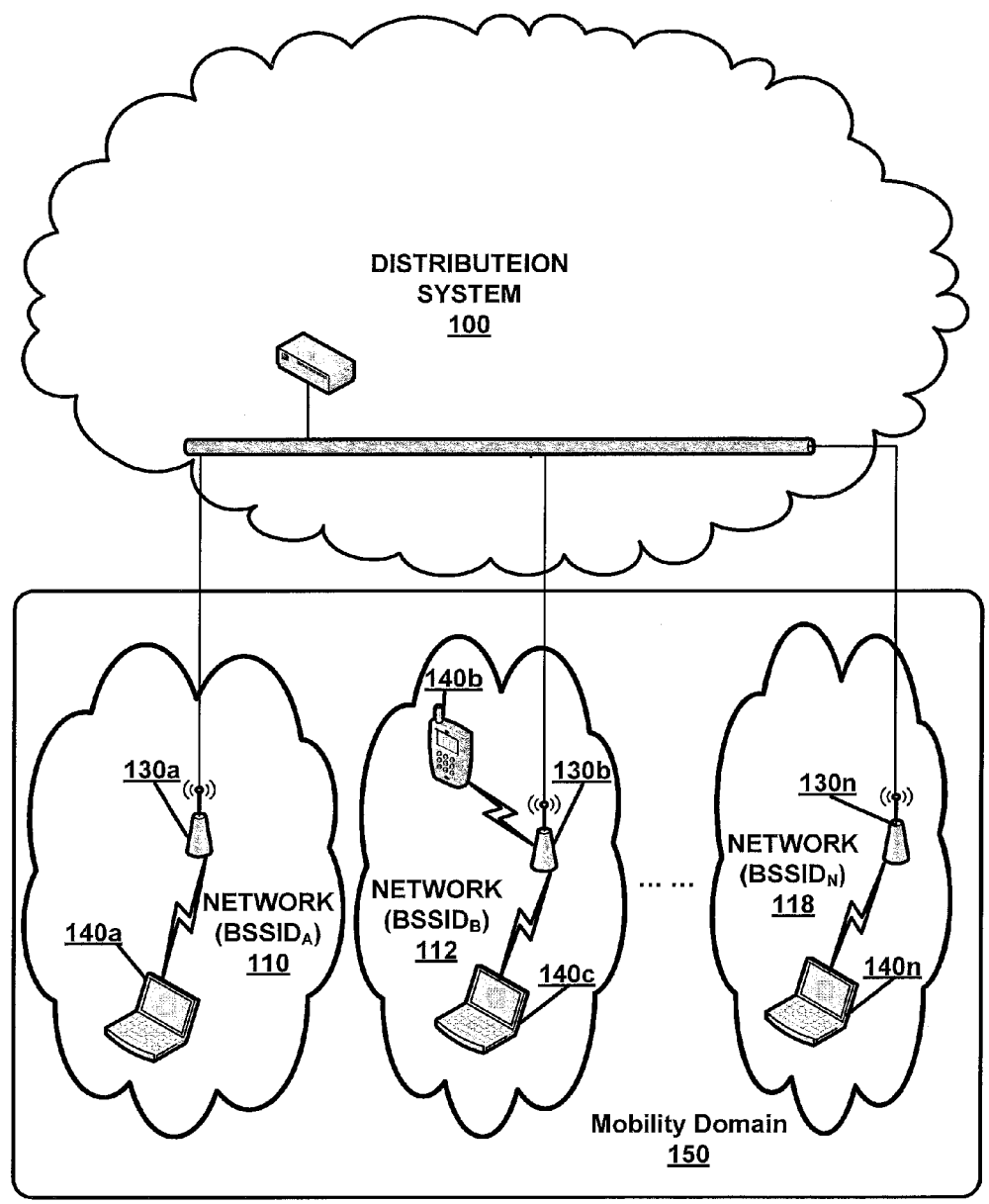
FIG. 1A shows an exemplary wireless network environment according to embodiments of the present disclosure.

In the following description, several specific details are presented to provide a thorough understanding. While the context of the disclosure is directed to fast BSS transition mechanisms in wireless network. One skilled in the relevant art will recognize, however, that the concepts and techniques disclosed herein can be practiced without one or more of the specific details, or in combination with other components, etc. In other instances, well-known implementations or operations are not shown or described in details to avoid obscuring aspects of various examples disclosed herein. It should be understood that this disclosure covers all modifications, equivalents, and alternatives falling within the spirit and scope of the present disclosure.

Overview

Embodiments of the present disclosure relate to wireless mobile device handoffs in general, and fast BSS transition mechanisms in particular. Specifically, embodiments of the present disclosure provide for appropriate determination of first level security key holders for a client based on movement of the client within the network and/or the relative load on various wireless network devices within a mobility domain. Appropriate determination of the first level security key holder can reduce the latency in completion of fast BSS transition for the wireless stations (also referred to as "wireless clients") in the network. Also, the disclosed system will provide better load balancing of clients among the wireless network devices within the mobility domain.

Note that, the mechanisms for determining the first level key holders described herein below can also be used to determine other leveled security key holders in a key hierarchy without departing from the spirit of the invention. Also, the appropriate first level security key holder can be determined based on the roaming or connection pattern of a wireless station, or via random election, or based on the wireless station's initial association with a mobility domain or wireless network, or based on the wireless station's connectivity, or using a combination of the above.

With the solution provided herein, the disclosed network device detects a roaming or connection pattern of one or more wireless clients in the wireless network based on requests received from the wireless clients. The network device also determines one or more selecting rules for selecting an appropriate first level key holder for the wireless client among a plurality of network devices. Also, the network device prioritizes the one or more selecting rules, and selects the appropriate first level key holder based on the determined rules and their corresponding priorities.

Specifically, the one or more selecting rules may include: a first selecting rule based on an initial association of a specific wireless client with the wireless network; a second selecting rule based on a roaming or connection pattern of the specific wireless client; a third selecting rule based on a random election among a plurality of network devices capable of servicing as the appropriate first level key holder for the specific wireless client; and, a fourth selecting rule based on connectivity of the specific wireless client.

Note that the selected appropriate first level key holder can store security association information (such as PMK-R0 Security Association) for a specific wireless client upon successful authentication to avoid regeneration of the security association information when the wireless client subsequently initiates a fast basic service set transition to another network device in the wireless network.

In some embodiments, the first selecting rule is a default selecting rule. That is, a wireless network device near a location where the specific wireless client initially associate with the network (e.g., by initiating an Initial Mobility Domain Association (IMDA) request) will be selected as the appropriate first level key holder for the specific wireless client.

In some embodiments, the second selecting rule based on the specific wireless client's roaming or connection pattern is associated with high priority when the specific wireless client spends more time near a second key holder than a first key holder based on the roaming or connection pattern. Moreover, the initial first level key holder is near a first location at which the specific wireless client initiates association with the wireless network; and, the second first level key holder is located near a second and different location which is the current location of the specific wireless client. Furthermore, the second selecting rule facilitates selecting the second first level key holder as the appropriate key holder for the specific wireless client. For illustration only, the roaming pattern may include a sequence of the network devices that the wireless client associates with; and the connection pattern may include a sequence of connection or disconnection activities by the wireless client from one or more network devices in the wireless network.

In some embodiments, when the second selecting rule is associated with high priority, the network device further detects existence of the second first level key holder, which is located near the current location of the specific wireless client and which is capable of servicing as the first level key holder for the specific wireless client. Also, the network device can remove cached security association information associated with the specific wireless client from the previous first level key holder upon detecting the existence of the new first level key holder.

In some embodiments, the third selecting rule, which is based on random selection of first level key holder among a plurality of network devices capable of servicing as the appropriate first level key holder for the wireless client, is associated with a high priority when a plurality of wireless clients initiate associations with the wireless network within a short time period.

In some embodiments, when the third selecting rule is associated with a high priority, the network device also identifies a subset of possible network devices from the plurality network devices capable of servicing as the appropriate first level key holder for the specific wireless client based on one or more of: a total number of wireless clients serviced by a respective network device, and/or a current load on the respective network device. Moreover, upon identifying the subset of possible network devices, the third selecting rule facilitates selecting a random network device from the subset of possible network devices as the appropriate first level key holder for the wireless client.

In some embodiments, the fourth selecting rule, which is based on connectivity of the wireless client, is associated with a high priority, for example, when the wireless client is associated with a network device for an extended period of time. The associated network device may be neither the network device that the wireless client associates with during IMDA, nor the network device located close to the current location of the wireless client.

Computing Environment

FIG. 1 shows an exemplary wireless digital network environment according to embodiments of the present disclosure. FIG. 1 includes a distribution system 100 coupled to at least one mobility domain 150. In some embodiments, distribution system 100 may be an Ethernet system.

Mobility domain 150 includes a plurality of networks, such as network 110 (with $BSSID_A$), network 112 (with $BSSID_B$), ... network 118 (with $BSSID_N$). Each network may operate on a private network including one or more local area networks. The local area networks may be adapted to allow wireless access, thereby operating as a wireless local area network (WLAN). In some embodiments, all networks, such as networks 110, 112, 118, and so on, share the same extended service set (ESS) although each network corresponds to a unique basic service set (BSS) identifier.

One or more management network device, such as an access point, a network controller, a switch, a router, and so on, may be located in network 110, network 112, network 118, or other similar networks, as well as distribution system 100. For example, as illustrated in FIG. 1, network 110 comprises access point 130a and one or more wireless stations including wireless station 140a. Further, network 112 comprises access point 130b and one or more wireless stations including wireless station 140b and wireless station 140c. Likewise, network 118 comprises access point 130n, and one or more wireless stations including wireless station 140n. In some embodiments, network controllers are designated as the first level key holders and access points are designated as the second level key holder.

During operations, a wireless station, such as wireless stations 140a, 140b, 140c, . . . 140n, etc., are associated with their corresponding access points 130a, 130b, . . . 130n, etc. Each wireless station may roam to associate with another access point in the network. Note that although only one mobility domain is depicted in FIG. 1, two or more mobility domains may be included in the system and coupled to distribution system 100 without departing from the spirits of the present disclosure. Thus, the new access point that the wireless station will be associated with may be located within the same mobility domain as or a different mobility domain from the mobility domain corresponding to the access point that the wireless station is currently associated with.

Figure 1B:
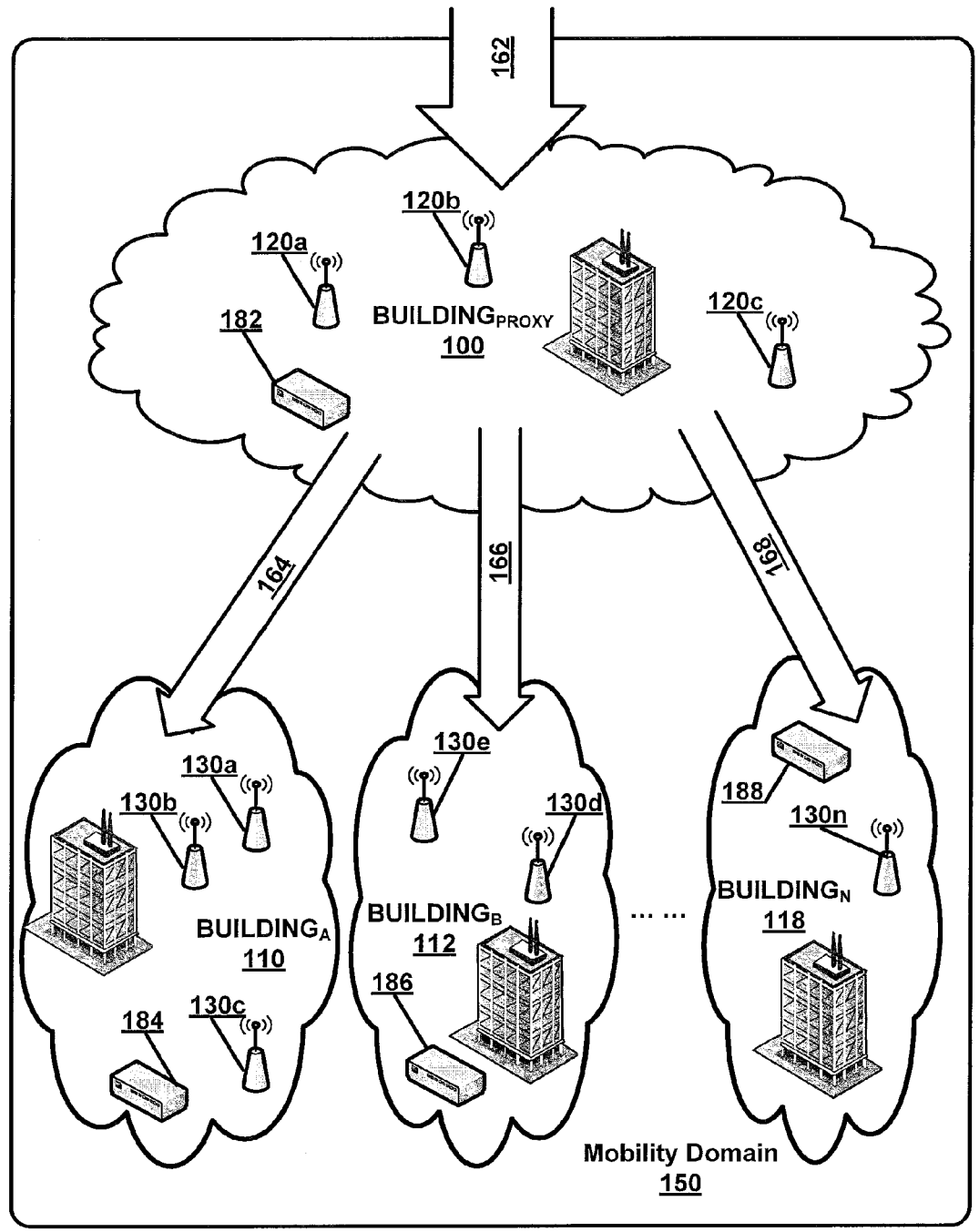
FIG. 1B shows another exemplary wireless network environment according to embodiments of the present disclosure.

FIG. 1B shows another exemplary wireless network environment according to embodiments of the present disclosure. In this example, multiple corporate buildings, such as Building$_{PROXY}$ 100, Building$_A$ 110, Building$_B$ 112, . . . , Building$_N$ 118, are located in a single mobility domain 150. Specifically, Building$_{PROXY}$ 100 is deployed with one or more wireless network devices, such as access point 120a, access point 120b, access point 120c, and network switch 182; Building$_A$ 110 is deployed with one or more wireless network devices, such as access point 130a, access point 130b, access point 130c, and network switch 184; Building$_B$ 112 is deployed with one or more wireless network devices, such as access point 130d, access point 130e, and network switch 186; . . . ; Building$_N$ 118 is deployed with one or more wireless network devices, such as access point 130n and network switch 186; etc. In the illustrated example, all wireless client stations and/or users will come to the corporate campus through Building$_{PROXY}$ 100 irrespective of which building a particular wireless client station and/or user will stay during most part of the day. Therefore, depending on which building the wireless client stations and/or users will subsequently roam to, network traffic 162 from wireless clients will be split into network traffic 164 directed to Building$_A$ 110, network traffic 166 directed to Building$_B$ 112, and network traffic 168 directed to Building$_N$ 118 in mobility domain 150.

There are two disadvantages in the scenario illustrated in FIG. 1B. First, every time a wireless client associates with mobility domain 150, e.g. through an Initial Mobility Domain Association (IMDA), it will likely associate with a wireless network device in Building$_{PROXY}$ 100, because it is the entrance building to the campus. Thus, the wireless network device in Building$_{PROXY}$ 100 will likely act as the first level security key holder for a disproportionately large number of wireless clients, even though some of the wireless clients will eventually roam to and spend most of the time in a different building in the corporate campus.

Second, a wireless client that stays in, for example, Building$_B$ 112, for most part of the day may have its first level security key holder in Building$_{PROXY}$ 100 due to the reasons mentioned above. Every time when this wireless client initiates a Fast BSS Transition (FT), the wireless network device in Building$_B$ 112 has to forward the management frames back to its first level security key holder in Building$_{PROXY}$ 100. This procedure adds an undesirable latency to the completion of the Fast BSS Transition (FT) process.

Hierarchical Security Key Management Scheme

Figure 2:
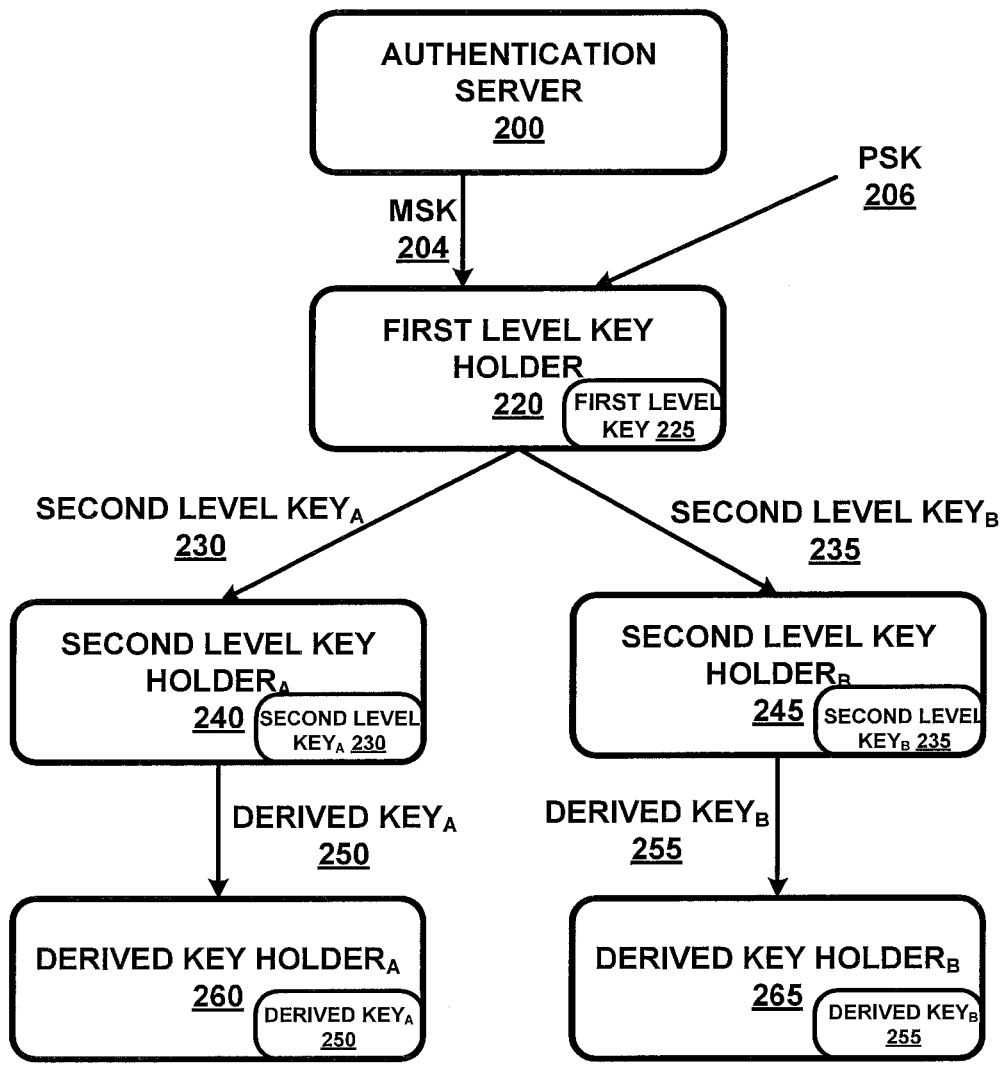
FIG. 2 is a block diagram illustrating an exemplary hierarchical security key management scheme used in fast BSS transition according to embodiments of the present disclosure.

FIG. 2 illustrates an exemplary hierarchical security key management scheme used in fast BSS transition. The hierarchical security key management scheme consists of multiple levels. Each security key holder may be a part of either an access point key management (i.e., authenticator key holders) or a station key management (i.e., supplicant key holders). In the exemplary three-level security key management scheme depicted in FIG. 2, the fast BSS transition key holder architecture includes at least the first level pairwise master keys (PMK-R0), the second level pairwise master keys (PMK-R1), and the derived security keys (pairwise transient key, PTK).

Moreover, the functions of IEEE 802.1X authenticator are distributed among the first level security key holder 220 (e.g., R0KH for authenticator) and the second level security key holders 240 (e.g., R1KH for authenticator) in each network that is associated with a unique BSSID. The first level security key holder 220 interacts with the IEEE 802.1X authenticator 200 to receive MSK 204 or PSK 206, which results from an Extensible Authentication Protocol (EAP) authentication. The second level security key holder 240 interacts with the IEEE 802.1X authenticator 200 to open a controlled port. IEEE 802.1X standard defines two logical port entities for an authenticated port—the "controlled port" and the "uncontrolled port." The controlled port is manipulated by the 802.1X Port Access Entity (PAE) to allow or prevent network traffic ingressing to or egressing from the controlled port based on the authorization state. On the other hand, the uncontrolled port is used by the PAE to transmit and receive EAP over LANs (EAPOL) frames.

First level key holder 220 (e.g., R0KH in IEEE 802.11r) stores the first level keys (e.g., PMK-R0 in IEEE 802.11r) for the wireless devices in the network. In some embodiments, a single first level key holder 220 is designated for every wireless client in the same mobility domain. According to some embodiments, first level key 225 (e.g., PMK-R0 in IEEE 802.11r) is unique to each wireless client and remains the same for the wireless client as long as the wireless client is associated with the same mobility domain. In some embodiments, first level key 225 is derived from a master session key (MSK) 204, which is received from authentication server 200, or a pre-shared key (PSK) 206, which is pre-established between the wireless client and the wireless network.

Authentication server 200 can typically be a Remote Authentication Dial-In User Service (RADIUS) server and any other network servers capable of processing Authentication, Authorization, and Accounting (AAA) transactions. MSK 204 is formed at the supplicant and authentication server 200 during an initial association phase, such as the Initial Mobility Domain Association (IMDA) to the authenticator. Moreover, PSK 206 is pre-established between the wireless client and the wireless network.

MSK 204 or PSK 206 is used to derive the first level pairwise master key (e.g., first level key 225 or PMK-R0 under IEEE 802.11r) on both the supplicant and authenticator. Whether MSK 204 or PSK 206 is used to derive first level key 225 is based on the Authentication and Key Management (AKM) suite negotiated by a second level key holder 240 or 245. For example, in some embodiments, if the negotiated AKM is 00-0F-AC:3, then MSK 204 will be used to derive first level key 225 (e.g., PMK-R0); if the negotiated AKM is 00-0F-AC:4, then PSK will be used to derive first level key 225.

Moreover, first level security key 225 (e.g., PMK-R0) can also be derived from one or more of the following information:

Service set identifier (SSID);
Length of SSID;
Mobility domain identifier (MDID);
Unique identifier associated with first level key holder for authenticator (R0KH-ID, e.g., the network controller's MAC address);
Length of unique identifier associated with the first level key holder for authenticator (R0KH-ID);
Unique identifier associated with first level key holder for supplicant (S0KH-ID, e.g., the supplicant's MAC address); and
An input used to derive the first level security key (e.g., FT-R0 under IEEE 802.11r standard).

In some embodiments, the input used to derive the first level security key can be a fixed string input to a one-way hash function, such as a KDF-384 hash function. For example, R0-Key-Data may be a hash result that is produced by a hash function performed on any combination of inputs such as XXKey, FT-R0, SSIDlength, SSID, MDID, R0KH-ID, S0KH-ID, etc. More specifically, the first level security key data (which can be used to directly derive the first level security key) can be calculated according to the following formula:

$$R0\text{-Key-Data}=KDF\text{-}384\ (XX\text{Key, "}FT\text{-}R0\text{", }\\ \text{SSIDlength}\|\text{SSID}\|\text{MDID}\|R0\text{KH-ID}\|S0\text{KH-ID})$$

In some embodiments, from the first level PMK (e.g., PMK-R0), a set of unique second level PMKs (e.g., PMK-R1s) is derived on the supplicant and authenticator, whereas each second level PMK (e.g., PMK-R1 under IEEE 802.11r) corresponds to a second level key holder (such as an access point) in the network. The first level key holder (e.g., R0KH under IEEE 802.11r) then distributes, through a mutually-authenticated and confidential connection, each second level PMK (e.g., PMK-R1) to its corresponding second highest level key holder (e.g., R1KH). In some embodiments, the second level PMK is derived by the first level security key holder for the authenticator (e.g., R0KH) in conjunction with the first level security key holder for the supplicant (e.g., S0KH).

First level key holder 220 derives a second level security key for each second level key holder and client. Specifically, in the example illustrated in FIG. 2, second level key$_A$ 230 is derived for a specific client by first level key holder 220 and distributed to second level key holder$_A$ 240 from first level key holder 220; and second level key$_B$ 235, which is different from second level key$_A$ 230, is derived for the same client by first level key holder 220 and distributed to second level key holder$_B$ 245 from first level key holder 220. Second level key$_A$ 230 and second level key$_B$ 235 can be derived based on one or more of the following information:

First level key 225;
Unique identifier associated with second level key holder for authenticator (R1KH-ID, e.g., the BSSID associated with the access point);
Unique identifier associated with second level key holder for supplicant (S1KH-ID, e.g., the supplicant's MAC address); and
An input used to derive the second level security key (e.g., FT-R1 under IEEE 802.11r standard).

In some embodiments, the input used to derive the second level security key can be a fixed string input to a one-way hash function, such as a KDF-256 hash function. For example, PMK-R1 may be a hash result that is produced by a hash function performed on any combination of inputs such as PMK-R0, FT-R1, R1KH-ID, S1KH-ID, etc. More specifically, the second level security key can be calculated according to the following formula:

$$PMK\text{-}R1=KDF\text{-}256\ (PMK\text{-}R0\text{, "}FT\text{-}R1\text{", }R1\text{KH-}\\ \text{ID}\|S1\text{KH-ID})$$

Hence, first level key holder 220 stores first level key 225. Second level key holder$_A$ 240 stores second level key$_A$ 230; and second level key holder$_B$ 245 stores second level key$_B$ 235, respectively. In some embodiments, a secure channel is established between first level key holder 220 and each second level key holder 240 or 245 to directly exchange cryptographic keys without being exposed to any intermediate parties. The cryptographic strength of the secure channel is greater than or equal to the strength of the secure channels for which the exchanged cryptographic keys will be used.

Although only one first level key holder 220 is depicted in FIG. 2, it shall be noted that authentication server may provide MSK 204 to (or PSK 206 may be configured on) two or more first level key holders 220 in different mobility domains. Moreover, although two second level key holders are depicted in FIG. 2, a mobility domain may include more than two second level key holders, such as second level key holder$_A$ 240 or second level key holder$_B$ 245, or only one second level key holder.

In addition, second level key holders for authenticator and supplicant derive the derived keys (such as derived key$_A$ 250 and derived key$_B$ 255) in conjunction with each other. In some embodiments, derived keys are the third level keys in a fast BSS transition (FT) key hierarchy. In one embodiment, the derived keys are pairwise transient keys (PTKs). In some embodiments, the derived keys can be derived from one or more of the following information:

Second level key, such as second level key$_A$ 230 or second level key$_B$ 235;
A random number generated by an authenticator (e.g., ANonce);
A random number generated by a supplicant (e.g., SNonce);
A unique network identifier (e.g., the BSSID associated with the access point);
A unique client identifier (e.g., the wireless client station's MAC address); and
An input used to derive the derived security key (e.g., FT-PTK under IEEE 802.11r standard).

In some embodiments, the input used to derive the derived security key can be a fixed string input to a one-way hash function, such as a SHA-256 based pseudo-random hash function (e.g., KDF-PTKLen hash function). For example, PTK may be a hash result that is produced by a hash function performed on any combination of inputs such as PMK-R1, FT-PTK, SNounce, ANounce, BSSID, Station address (STA-ADDR), etc. More specifically, the derived security key can be calculated according to the following formula:

$$PTK=KDF\text{-}PTKLen\ (PMK\text{-}R1\text{, "}FT\text{-}PTK\text{", }\\ S\text{Nounce}\|A\text{Nounce}\|BSSID\|STA\text{-}ADDR)$$

Fast Basic Service Set (BSS) Transition (FT) Mechanism

Figure 3A:
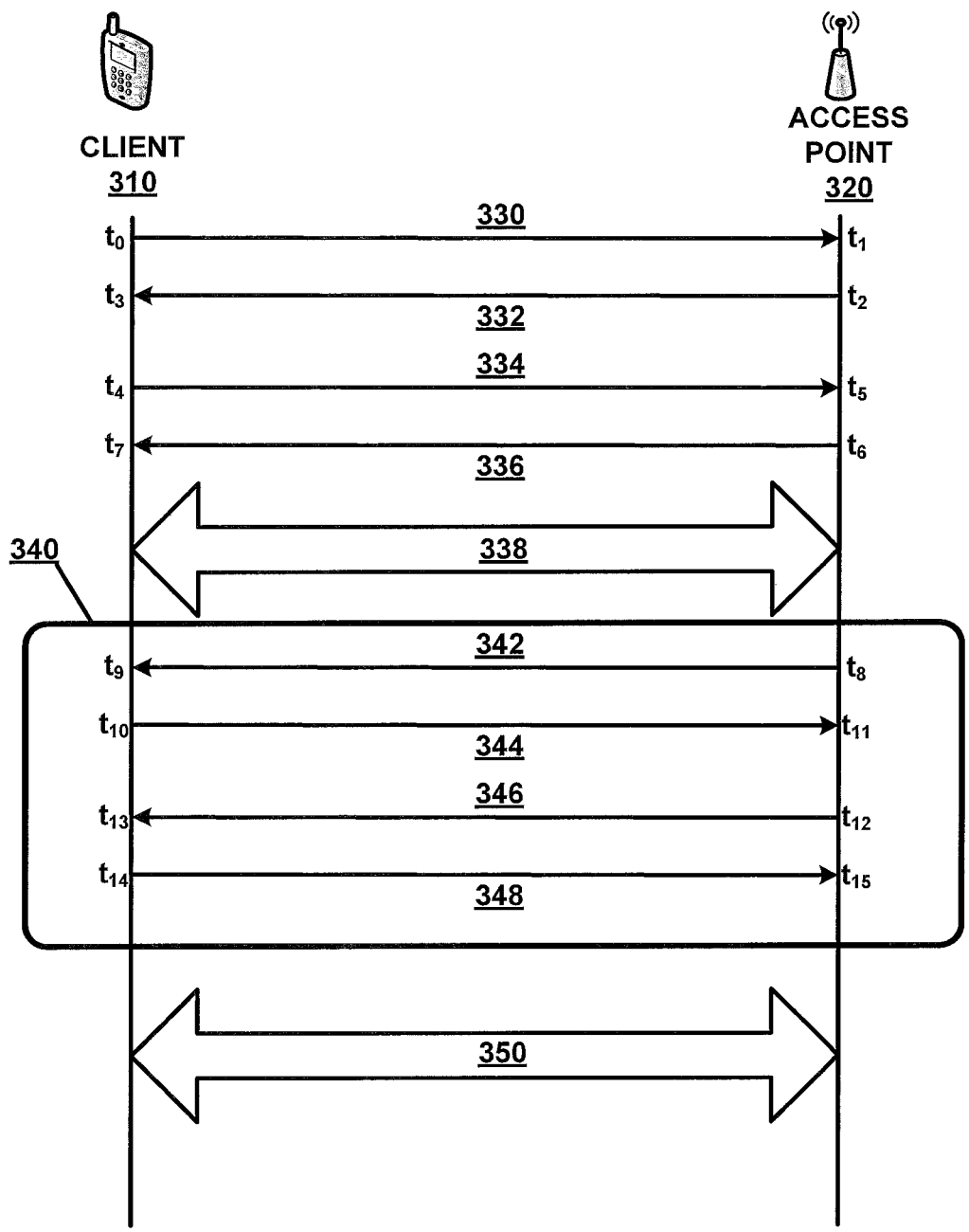
FIG. 3A is a sequence diagram illustrating an exemplary communication exchanges during an initial mobility domain association under fast BSS transition according to embodiments of the present disclosure.
Figure 3B:
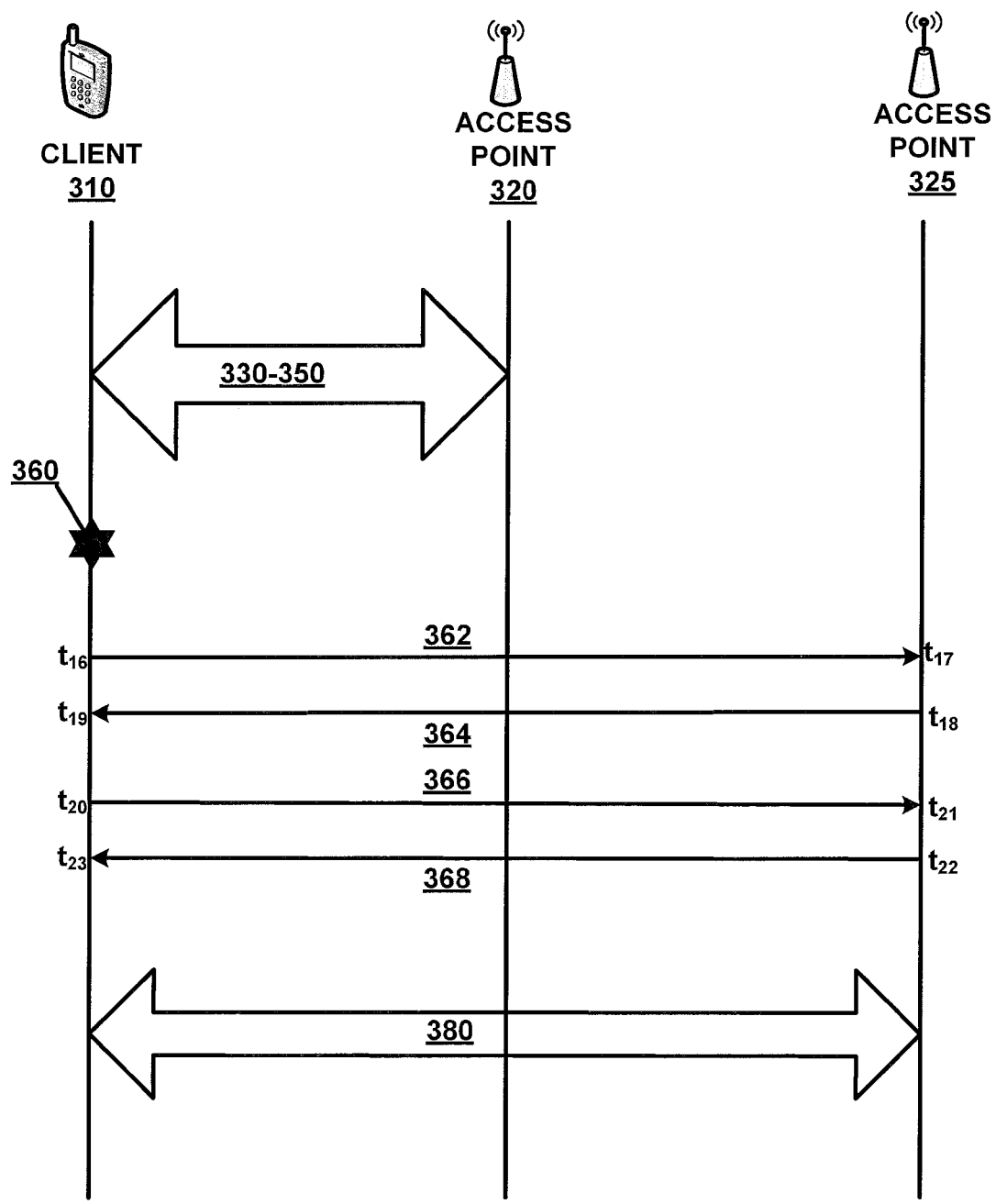
FIG. 3B is a sequence diagram illustrating an exemplary communication exchanges under fast BSS transition according to embodiments of the present disclosure.

FIGS. 3A-3B illustrate exemplary communications exchanges during fast BSS transition. In a basic FT process, when a wireless station moves into the coverage of a mobility domain for the very first time, the wireless station will start interacting with the wireless network device (such as an access point), which is located in the closest proximity to the station. The wireless station will follow through an FT initial mobility domain association with the nearest access point.

Thereafter, when the wireless station roams to a different access point, the wireless station will follow through an FT (re)association procedure with the new access point to reduce the overhead handoff time and improve data connectivity.

A. FT Initial Mobility Domain Association

FIG. 3A illustrates the FT initial mobility domain association (IMDA), which occurs when a wireless station associates with a nearest access point in a mobility domain for the first time without any prior association with any other access points in the same mobility domain. In the FT IMDA, the following frames and/or information will be exchanged:

management frames to complete the authentication process;

management frames to complete the association process;

authentication exchanges, such as IEEE 802.1x EAP authentication (note that this is bypassed if PSK is used); and/or key exchanges, such as an EAPOL-Key handshake for key exchange.

Specifically, in the exemplary communication exchanges between client 310 and access point 320 in FIG. 3A, client 310 first initiating the FT IMDA by transmitting authentication request 330, such as an IEEE 802.11 authentication request, to the access point at time point $t_0$. After access point 320 receives authentication request 330 at time point $t_1$, access point 320 sends authentication response 332, e.g., an IEEE 802.11 authentication response, back to client 310 at time point $t_2$. In some embodiments, authentication request 330 and authentication response 332 both use Open System authentication mechanism in accordance with the IEEE 802.11r standard.

Next, upon successful authentication at time point $t_3$, client 310 will send association request 334 to access point 320 at time point $t_4$. According to some embodiments, association request 334 may include a Mobility Domain Information Element (MDIE) and a Robust Security Network Information Element (RSNIE) as specified in the IEEE 802.11 Standards. MDIE is included in association request 334 to indicate client 310's support for the FT procedures, whereas RSNIE is included in association request 334 to indicate client 310's security capabilities. Access point 320 can advertise the content of MDIE in its beacon or probe response frames.

Once association request 334 is received at access point 320 at time point $t_5$, access point 320 will send association response 336 at time point $t_6$; and association response 336 is received by client 310 at time point $t_7$. Note that, if the contents of MDIE do not match the contents advertised, or if the contents of RSNIE do not indicate a negotiated AKM suite of FT (such as, suite type 00-0F-AC:3 or 00-0E-AC:4), access point 320 will reject association request 334. In some embodiments, association response 336 may include a Mobility Domain Information Element (MDIE) with contents as presented in beacon and/or probe response frames, and a Fast BSS Transition Information Element (FTIE), as specified in the IEEE 802.11r standard. The FTIE may include, for example, a unique identifier associated with the first level key holder (e.g., R0KH-ID under IEEE 802.11r) and/or a unique identifier associated with the second level key holder (e.g., R1KH-ID under IEEE 802.11r).

Upon successful association between client 310 and access point 320, the supplicant's first level key holder (e.g., S0KH) on client 310 and the authenticator's first level key holder (e.g., R0KH) on access point 320 or a network controller coupled to access point 320 will proceed to perform an authentication procedure 338 involving multiple communication exchanges in accordance with, e.g., IEEE 802.1X EAP authentication. Upon successful completion of authentication procedures 338 (e.g., IEEE 802.1X EAP authentication), the authenticator's first level key holder (R0KH) receives MSK and corresponding authorization attributes. If a key hierarchy already exists for client 320, the authenticator's first level key holder (R0KH) will delete existing first level and second level security keys, and re-calculate a new first level security key and a second level security key for client 310 using the received MSK. However, if PSK is used, the IEEE 802.1X EAP authentication procedure can be bypassed.

Next, the second level key holders for the supplicant and the authenticator perform an FT 4-way handshake 340. Specifically, at time point $t_8$, access point 320 (i.e., authenticator's second level key holder, R1KH) sends a first message 342, such as an EAPOL-Key frame including a random number generated by the authenticator (e.g., ANonce), to client 310 (i.e. supplicant's second level key holder, S1KH). Client 310 receives the first message 342 at time point $t_9$, and sends a second message 344 to access point 320 at time point $t_{10}$. The second message 344 can be an EAPOL-Key frame. In one embodiment, the EAPOL-Key frame of the second message 342 includes a random number generated by the supplicant (e.g., SNonce), and RSNIE which indicates the name of the second level security key (e.g., PMK-R1) calculated by the supplicant's second level key holder (S1KH) based on a pre-agreed-upon procedure. Thereafter, at time point $t_{11}$, access point 320 receives the second message 344 and sends a third message 346 to client 310 at time point $t_{12}$. In one embodiment, the third message 346 is an EAPOL-Key frame, which includes ANonce and the name of the second level security key (e.g., PMK-R1). This name in the third message 346 should be the same as the one received in the second message 344. After client 310 receives the third message 346 at time point $t_{13}$, client 310 sends a fourth message 348 back to access point 320 at time point $t_{14}$, and access point 320 receives the fourth message 348 at time point $t_{15}$. Note that the RSNIE fields, as well as the FTIE and MDIE, in the EAPOL-Key frames used in the 4-way handshake 340 shall be consistent among the first message 342, the second message 344, the third message 346, and the fourth message 348.

Finally, upon completion of the 4-way handshake 340, derived keys (e.g., PTKs) will be calculated for each specific <second level key holder, client> pair. Also, the IEEE 802.1X controlled port will be opened on both client 310 and access point 320. All subsequent communication exchanges 350 involving data transmissions between client 310 and access point 320 shall be protected by the derived key.

B. FT Roaming within Mobility Domain

FIG. 3B illustrates exemplary communication exchanges during an FT roaming by client 310 from one access point 320 to another access point 325, which is located within the same mobility domain. In this example, client 310 has followed through communication exchanges 330-350, as described above in reference to FIG. 3A, with access point 350. Then, client 310 roams to a new location and decides 360 to initiate FT to another network device, such as access point 325.

In the communication exchanges between client 310 and access point 325, the following frames are exchanged in the following time sequence:

An authentication request 362, which is sent by client 310 at time point $t_{16}$ and received by access point 325 at time point $t_{17}$.

An authentication response 364, which is sent by access point 325 at time point $t_{18}$ after completing an authentication process, e.g., EAPOL with an authentication server, and which is received by client 310 at time point $t_{19}$;

A re-association request 366, which is sent by client 310 at time point $t_{20}$ and received by access point 325 at time point $t_{21}$; and A re-association response 368, which is sent by access point 325 at time point $t_{22}$ and received by client 310 at time point $t_{23}$.

The exchange of information through these communication exchanges between client 310 and access point 325 complete the association between client 310 and access point 325, and also complete derivation of the derived key (e.g., PTK). Thereafter, all subsequent communication exchanges 380 involving data transmissions between client 310 and access point 325, e.g., using EAPOL-Key frames, shall be protected by the derived key.

Determination of Leveled Security Key Holders

In some embodiments, each wireless client in mobility domain 150 has a single first level security key holder, and one or more second level security key holders. In order to derive the derived key (e.g., PTK), each second level security key holder requests the second level security key, which is generated and sent to the second level security key holders by the first level security key holder.

In one embodiment, the first level security key holder can be a network controller, and the second level security key holders can be access points coupled to the network controller. Hence, as long as a wireless client roams between access points that are terminated on the same network controller, there will be no need for any extra requests to retrieve the second level security keys for the wireless client from the network controller. Nevertheless, whereas the wireless client physically moves from one location, e.g., Building$_{PROXY}$ 100, to another location, e.g., Building$_B$ 112, and whereas the target access points in the new location (i.e., Building$_B$ 112) are coupled to a different network controller, in order to complete the derivation of the derived keys (e.g., PTK), the target access point in the new location will need to request for the second level security key from the first level security key holder, which is physically located in the original location. This will lead to some overhead time due to extra messages being sent back and forth to retrieve the second level security key from the first level security key holder, and therefore introducing latency to the completion of the Fast BSS Transition (FT) process.

Moreover, since most wireless clients would complete their Initial Mobility Domain Association (IMDA) with the wireless network device at the original location, e.g., Building$_{PROXY}$ 100, the network controller in Building$_{PROXY}$ 100 would likely end up acting as the first level security key holder for a majority of the wireless clients serviced in the network. Thus, the network controller in Building$_{PROXY}$ 100 would not only need to service the wireless clients that are associated to it but also respond to requests for the second level security keys for the rest of the wireless clients that are being serviced by other wireless network devices and/or network controllers. Hence, in such a scenario, it is possible that one of the wireless network devices in the network becomes overloaded while the remaining wireless network devices in the network are not being fully utilized. Over time, such a scenario would potentially jeopardize performance of the network.

Figure 4A:
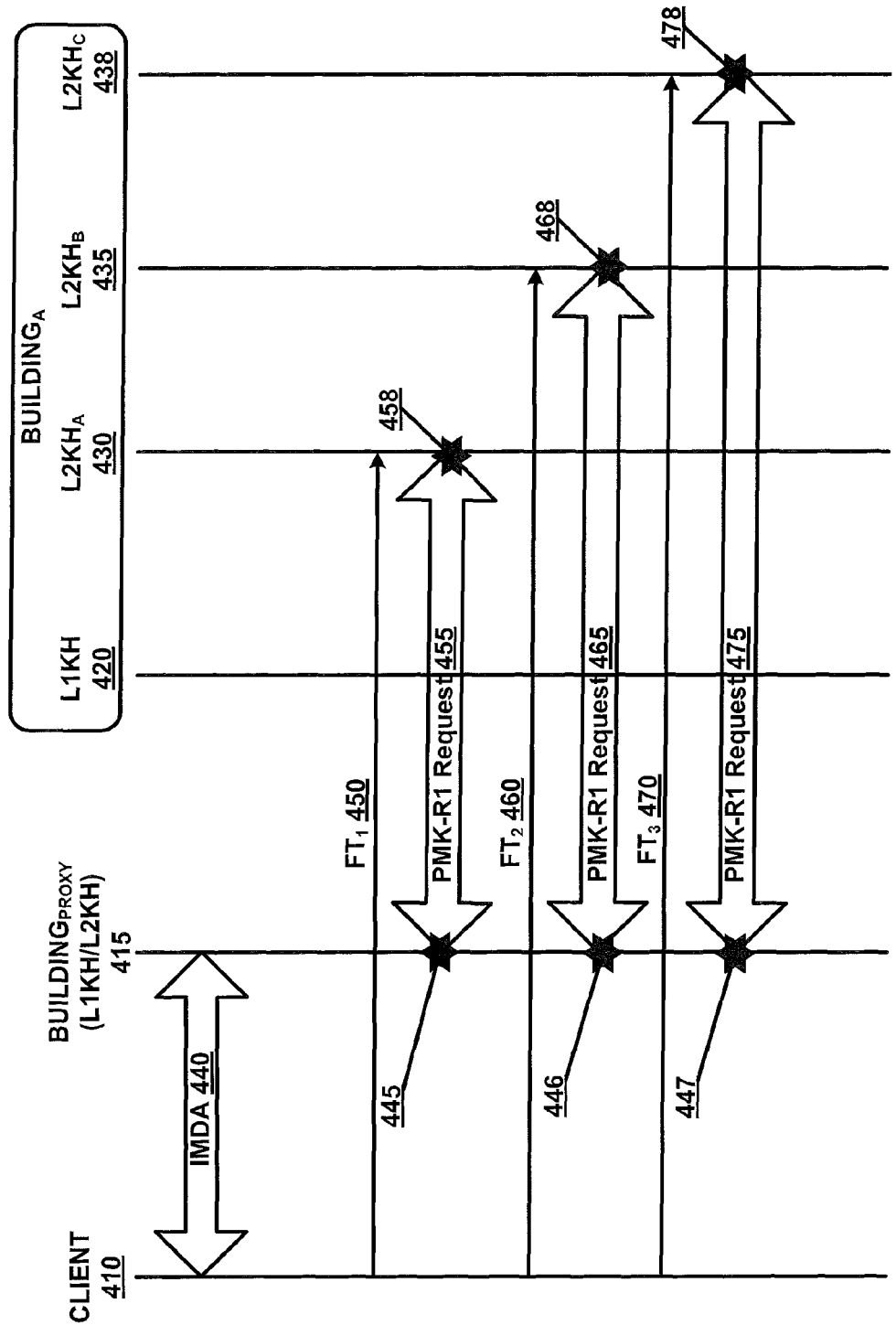
FIGS. 4A-4B are sequence diagrams illustrating exemplary communication exchanges during generation and distribution of leveled security keys under fast BSS transition according to embodiments of the present disclosure.
Figure 4B:
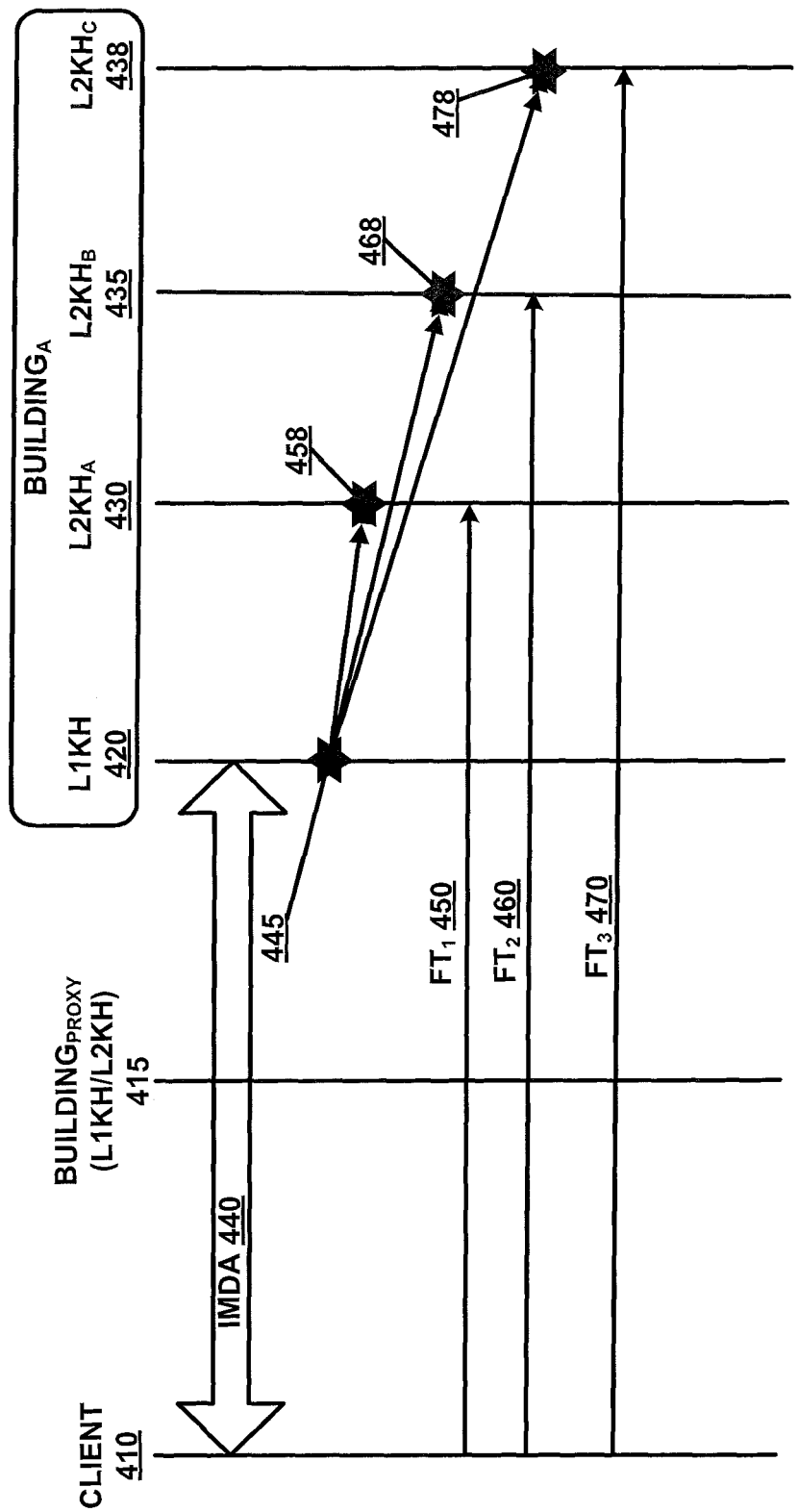

A. Determination of Leveled Key Holder Based on Roaming or Connection Pattern and/or Client Connectivity FIGS. 4A-4B are sequence diagrams illustrating exemplary communication exchanges during determination of leveled security keys under fast BSS transition. In particular, FIG. 4A shows generation and distribution of leveled security keys when the first level key holder is located in a different building from the second level key holders for the client, and thus not directly coupled to the second level key holders. FIG. 4A includes at least client 410, Building$_{PROXY}$ 415, and Builidng$_A$. Building$_{PROXY}$ 415 and Builidng$_A$ each includes both a wireless network device acting as a first level key holder and one or more network devices acting as second level key holders. Specifically, Builidng$_A$ includes a first level key holder L1KH 420, and three second level key holders, namely L2KH$_A$ 430, L2KH$_B$ 435, and L2KH$_C$ 438.

During operations, client 410 first completes initial mobility domain association 440, e.g., IEEE 802.11r IMDA 4-way handshake exchanges, with wireless network devices (e.g., L1KH or L2KH) 415. Specifically, the 4-way handshake exchanges 440 include EAPOL communication exchanges to obtain a MSK from an authentication server. After IMDA, the first level key holder L1KH receives the MSK from the authentication server, and uses the information it has, including MSK or PSK, to derive a first level security key (e.g., PMK-R0) and the second level security keys (e.g., PMK-R1). Note that each second level security key (e.g., PMK-R1) is associated with client 410 for a specific second level key holder (e.g., L2KH at Building$_{PROXY}$ 415, L2KH$_A$ 430, L2KH$_B$ 435, or L2KH$_C$ 438) that client 410 could potentially roam to.

In the example illustrated in FIG. 4A, client 410 subsequently roams to Building$_A$ and associates with L2KH$_A$ 430, L2KH$_B$ 435, and L2KH$_C$ 438 in that order. When client 410 roams to associate with L2KH$_A$ 430, it initiates the first Fast BSS transition (FT) request FT$_1$ 450 to L2KH$_A$ 430. Upon receiving FT$_1$ 450, L2KH$_A$ 430 will send a request, such as PMK-R1 request 455, to obtain the second level security key from the first level security key holder for client 410, which is L1KH in Building$_{PROXY}$ 415. Then, L1KH in Building$_{PROXY}$ 415 generates or retrieves the second level security key for client 410 at time point 445, and transmits the second level key to L2KH$_A$ 430, which receives the second level security key at time point 458 and uses the second level security key to derive the derived key (e.g., PTK).

Next, client 410 roams to associate with L2KH$_B$ 435 by initiating a second FT request FT$_2$ 460 to L2KH$_B$ 435. Upon receiving FT$_2$ 460, L2KH$_B$ 435 will send a request, such as PMK-R1 request 465, to obtain the second level security key from the first level security key holder for client 410, which is L1KH in Building$_{PROXY}$ 415. Then, L1KH in Building$_{PROXY}$ 415 generates or retrieves the second level security key for client 410 at time point 446, and transmits the second level key to L2KH$_B$ 435, which receives the second level security key at time point 468.

Finally, client 410 roams to associate with L2KH$_C$ 438 by initiating a third FT request FT$_3$ 470 to L2KH$_C$ 438. Upon receiving FT$_3$ 470, L2KH$_C$ 438 will send a request, such as PMK-R1 request 475, to obtain the second level security key from the first level security key holder for client 410, which is L1KH in Building$_{PROXY}$ 415. Then, L1KH in Building$_{PROXY}$ 415 generates or retrieves the second level security key for client 410 at time point 447, and transmits the second level key to L2KH$_C$ 438, which receives the second level security key at time point 478.

Therefore, when L1KH is determined to be located in Building$_{PROXY}$ 415, and when client 410 often roams to Building$_A$, the second level security key holders in Builidng$_A$ would need to initiate key requests, e.g., PMK-R1 requests 455, 465 and 475, to L1KH in Building$_{PROXY}$ 415. This will cause latencies during the FT process.

Alternatively, when client 410 often roams to Building$_A$, but initiates IMDA with a wireless network device in Building$_{PROXY}$ 415, the network may be configured to observe and recognize such client roaming or connection pattern, and designate L1KH 420 in Building$_A$ to be the first level security key holder. That is, the network will configure the first level security key holder to be the network controller in a location where a wireless client anticipates spending most of the time while being associated with a network, rather than the network controller directly coupled to the specific wireless network device that the wireless client first associates with when connecting to the network initially.

In the example illustrated in FIG. 4B, even though client 410 may enter the mobility domain through Builidng$_{PROXY}$ 415, L1KH 420 at Building$_A$ is determined to be the first level security key holder for client 410, because Building$_A$ is where client 410 spends most time while being associated with the mobility domain according to the roaming or connection pattern of client 410. At time point 445, L1KH 420 may generate the first level security keys, and may proactively generate multiple second level security keys, where each second level security corresponds with one of the second level key holders, such as L2KH$_A$ 430, L2KH$_B$ 435, and L2KH$_C$ 438.

In some embodiments, the first level security key holder, such as L1KH 420, can proactively propagate the second level security keys to the second level security key holders in the mobility domain. Therefore, as illustrated in FIG. 4B, L2KH$_A$ 430 receives the second level security key from L1KH 420 at time point 458; L2KH$_B$ 435 receives the second level security key from L1KH 420 at time point 468; and L2KH$_C$ 438 receives the second level security key from L1KH 420 at time point 478.

When client 410 associates with L2KH$_A$ 430, L2KH$_B$ 435, and L2KH$_C$ 438 in that order, client 410 initiates a fast BSS transition (FT) request to each of the second level security key holder respectively. Specifically, client 410 initiates FT$_1$ 450 to L2KH$_A$ 430, FT$_2$ 460 to L2KH$_B$ 435, and FT$_3$ 470 to L2KH$_C$ 438. However, in this example, upon receiving the FT request, none of the second level security key holders needs to request for the second level security key from the first level security key holder L1KH 420, because they have already previously received their respective second level security keys from the first level security key holder L1KH 420.

In some embodiments, the roaming or connection pattern of a client can be determined by keeping track of the number of requests for the second level security key (e.g., PMK-R1) received by a first-level security key holder for a client that is outside its associated set. In other words, the wireless client that requires the second-level security key is being serviced by a different network device (e.g., a network controller) that is also capable of acting as the first level security key holder for the wireless client.

In some embodiments, the system also keeps track of the time interval within which the requests for the second level security keys are being received. If the time interval does not exceed a predetermined threshold value, the system will still designate the first level security key holder coupling to the initially associated wireless network device as the first level security key holder for the client. Therefore, infrequent roaming by the client doesn't trigger a change in the first level security key holder. On the other hand, if the number of requests for the second level security keys reaches above the predetermined threshold value, the first level security key holder will be changed from an initial one to the one coupling to the wireless network devices that the client frequently roams to associate with.

Specifically, to facilitate the switch or reassignment of the first level security key holder, the initial first level security key holder for the client will stop servicing the client after it determines that the client has a better candidate to be its first level security key holder. Hence, the Security Associations in the initial first level security key holder will be deleted. Moreover, the client will be forced to undergo another Initial Mobility Domain Association (i.e., IMDA) with the wireless network device that is closer to its current position. In this way, a favorable first level security key holder would be determined for the client based on its roaming or connection pattern.

Hence, by determining L1KH 420 in Builidng$_A$ (that is, the network controller physically located in a region where client 410, based on observation and analysis of its roaming or connection pattern, spends most time during client 410's association with the mobility domain) to be the first level security key holder for client 410, the system's leveled key holder determination mechanism avoids unnecessary latencies during the FT process by removing the overhead in retrieving the second level security keys (PMK-R1s), which affects the time taken to complete the FT process. Also, the key holder determination mechanism allocates the load more fairly between Building$_{PROXY}$ and other buildings on the corporate campus.

B. Determination of Leveled Key Holder Based on Random Election

For illustration purposes only, let us assume that in FIG. 1B, mobility domain 150 includes only Building$_{PROXY}$ 100 and Building$_A$ 110, and that a vast majority of wireless clients enter the corporate campus through Building$_{PROXY}$ 100, but subsequently roam to Building$_A$ 110 and spend most of their time in Building$_A$ 110.

In this example, wireless clients associate to the network for the first time through a finite set of entry points, e.g., access point 120a, access point 120b, and access point 120c in Building$_{PROXY}$ 100. Therefore, the first level security key holder (e.g., a network controller) in Building$_{PROXY}$ 100 will be assigned as the first level security key holder for these wireless clients if the determination of leveled key holder is based on a wireless client's initial association.

Alternatively, the vast majority of these wireless clients will subsequently roam to Building$_A$ 110 and spend most of their time in Building$_A$ 110. Thus, the first level security key holder (e.g., a network controller) in Building$_A$ 110 will be assigned as the first level security key holder for the roaming wireless clients if the determination of leveled key holder is based on a wireless client's roaming or connection pattern as described in the section above.

Note that, in this example, both the network controller in Building$_{PROXY}$ 100 and the network controller in Building$_A$ 110 are capable of acting as the first level security key holders for the vast majority of the wireless clients. Nevertheless, in both of the above alternative determination mechanisms, only a small number of wireless network devices (either the network controller in Building$_{PROXY}$ 100 or the network controller in Building$_A$ 110) act as the first level security key holders for the vast majority of the wireless clients, even though these wireless clients could have been serviced from a different set or multiple sets of wireless network devices (e.g., by both the network controller in Building$_{PROXY}$ 100 and the network controller in Building$_A$ 110) during a large portion of the time while they are associated with the network.

Hence, in some embodiments, in order to avoid underutilization or overloading of a subset of wireless network devices capable of acting as leveled security key holders, the determination mechanism would randomly select a first level security key holder (e.g., a R0KH) for a wireless client. In some embodiments, the identification of possible wireless network devices for the random selection may be based on a plurality of factors, such as the number of wireless clients being serviced by each wireless network device, the current load on each wireless network device, etc. For example, a specific wireless network device may be excluded from the list of possible wireless network devices if the number of wireless clients serviced by the specific wireless network device, or the cumulative load on the wireless network device, or a combination of both, exceeds a predetermined threshold value. After identifying all possible wireless network devices capable of acting as the first level security key holder, e.g., R0KH, for the wireless client, when the wireless client associates to the network, the determination mechanism randomly selects an R0KH among all the possible wireless network devices in the subset. The random election of first level security holders for wireless clients reduces the imbalance in the network, and also leads to better load-balancing of the wireless clients among the wireless network devices.

C. Prioritization Between Multiple Key Holder Determination Mechanisms

As described above, the determination mechanism of leveled security key holders may be based on, for example, initial network/mobility domain association, wireless clients' roaming or connection patterns, and/or random election among possible wireless network devices. It shall be noted that multiple security key holder determination mechanisms can be used in conjunction with each other. Depending on the characteristics of the networking scenarios, determination mechanism may accordingly adopt a relative prioritization among multiple mechanisms when the multiple mechanisms are simultaneously active and/or applicable.

For illustration purposes only, let us assume that in FIG. 1B, mobility domain 150 includes Building$_{PROXY}$ 100, Building$_A$ 110, Building$_B$ 112, and Building$_N$ 118. Moreover, a vast majority of wireless clients enter the corporate campus through Building$_{PROXY}$ 100, but subsequently roam to other buildings, such as, Building$_A$ 110, Building$_B$ 112, . . . , or Building$_N$ 118, and spend most of their time in the other buildings. Further, assuming that each of Building$_{PROXY}$ 100, Building$_A$ 110, Building$_B$ 112, . . . , and Building$_N$ 118 has one wireless network device capable of acting as the first level security key holder for the wireless clients, and that none of the wireless network devices is overloaded. Thus, in this example, all of the wireless network devices in Building$_{PROXY}$ 100, Building$_A$ 110, Building$_B$ 112, . . . , and Building$_N$ 118 can be added to the list of possible first level security key holders for the wireless clients.

More specifically, assuming that, a particular user with a particular wireless client enters the corporate campus through Building$_{PROXY}$ 100, spends the first half of the day working in Building$_A$ 110, then a couple hours of the second half of the day meeting in Building$_N$ 118, and next back to work in Building$_A$ 110 until the end of the day. In this example, the determination mechanism may initially adopt a random election among all possible first level security key holders, which include all of the wireless network devices in Building$_{PROXY}$ 100, Building$_A$ 110, Building$_B$ 112, . . . , and Building$_N$ 118 as stated above. Let us assume, for the purpose of illustration, that the wireless network device in Building$_N$ 118 is selected as the first level security key holder for the wireless client. Next, the wireless client completes its Initial Mobility Domain Association (IMDA) with selected first level security key holder (i.e., R0KH in Building$_N$ 118), and then spends the first half of the day in Building$_A$ 110.

While the user spends time in Building$_A$ 110, he or she could roam around the building, which would lead to the initiation of the FT process. In some embodiments, upon detecting the initiation of FT process by a specific wireless client, the determination mechanism may adopt an approach based on the roaming or connection pattern of that specific wireless client. For example, the first level security key holder initially selected for the wireless client (i.e., R0KH in Building$_N$ 118) can perform a look-up in its associated wireless client set, and determine that the user is not a part of its associated set. Accordingly, the initial first level security key holder (i.e., R0KH in Building$_N$ 118) will stop servicing the user. As a result, the user is forced to initiate another Initial Mobility Domain Association (IMDA) with the first level security key holder in Building$_A$ 110 (i.e., R0KH in Building$_A$ 110) where the user spends the first half of the day.

Thereafter, in the second half of the day, the user moves to Building$_N$ 118 and roams around within Building$_N$ 118. As mentioned above, while the user roams around in Building$_N$ 118, the wireless client would initiate an FT process. In some embodiments, upon detecting the initiation of the FT process by the wireless client, the determination mechanism may adopt an approach based on the roaming or connection pattern of that wireless client. For example, the first level security key holder re-selected for the wireless client (i.e., R0KH in Building$_A$ 110) can perform a look-up in its associated wireless client set, and determine that the user is not a part of its associated set. Accordingly, the re-selected first level security key holder (i.e., R0KH in Building$_A$ 110) will stop servicing the user. As a result, the user is forced to initiate another Initial Mobility Domain Association (IMDA) with the first level security key holder in Building$_N$ 118 (i.e., R0KH in Building$_N$ 118) where the user spends a couple hours in the second half of the day.

Finally, when the user moves back to Building$_A$ 110, depending on the roaming or connection pattern of the wireless client, the wireless client may be assigned the same first level security key holder in Building$_A$ 110, following through the same process as described above. Alternatively, the wireless client may not change its re-selected first level security key holder in Building$_N$ 118, for example, when the user spends minimum amount of time in Building$_A$ 110 during the second half of the day.

In some embodiments, the determination mechanism based on random election of possible leveled security key holders is preferably utilized during the first time when a wireless client associates with a mobility domain, or enters a corporate campus. Such determination mechanism can ensure that, when a large number of wireless clients attempt to associate to the network within approximately same time period, the network will not become overloaded by servicing the demands of the large number of wireless clients.

In some embodiments, the determination mechanism based on the roaming or connection pattern of wireless clients is preferably utilized after the wireless clients complete their initial association with the network, and possibly upon detecting initiation of an FT process by a specific wireless client. Such determination mechanism ensures that, over time, each wireless client in the network receives services from an appropriate first level security key holder whose election is customized for each specific wireless client.

Leveled Security Key Holder Determination Process

Figure 5:
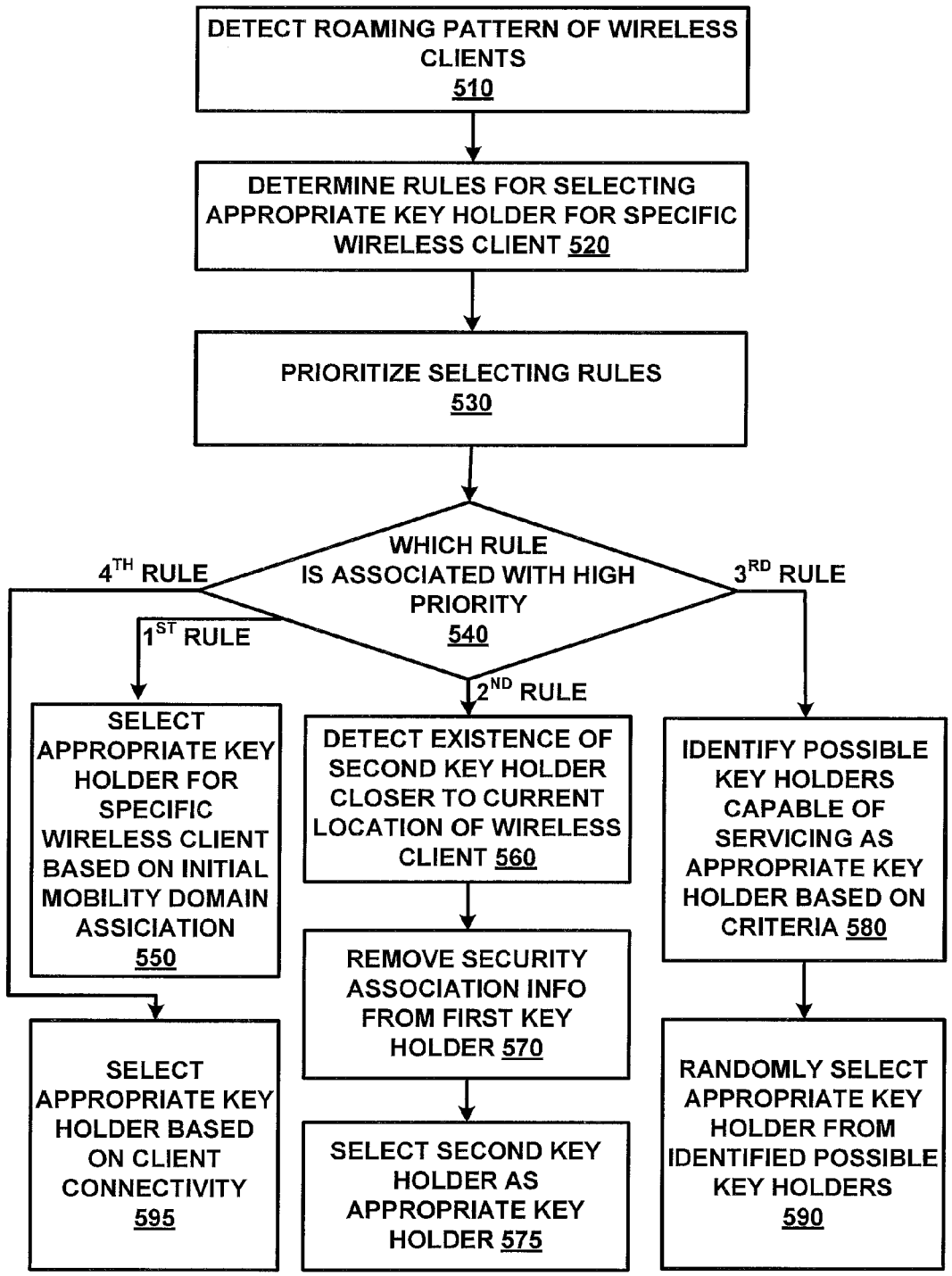
FIG. 5 is a flowchart illustrating a process for determining leveled security key holders according to embodiments of the present disclosure.

FIG. 5 is a flowchart illustrating a process for determining leveled security key holders for a wireless client according to embodiments of the present disclosure. During operations, the disclosed network device first detects roaming or connection pattern of a plurality of wireless clients (operation 510).

Next, the network device determines rules for selecting an appropriate key holder for the specific wireless client (operation 520), and prioritizes selecting rules (operation 530). In some embodiments, the applicable selecting rules may include, but are not limited to, a first selecting rule based on an initial association of a specific wireless client with the wireless network; a second selecting rule based on a roaming or connection pattern of the specific wireless client; a third selecting rule based on a random election among a plurality of network devices capable of servicing as the appropriate key holder for the specific wireless client; and, a fourth selecting rule based on the specific wireless client's connectivity.

The network device then checks which selecting rule(s) is/are associated with a high priority (operation 540). If the first selecting rule is associated with the high priority, the network device will select the appropriate first level key holder for the specific wireless client based on its initial mobility domain association (operation 550). Specifically, the network device will select a wireless network device near a location where the specific wireless client initially associate with the network, e.g., by initiating an Initial Mobility Domain Association (IMDA) request, as the appropriate first level key holder for the specific wireless client.

If, however, the second selecting rule is associated with the high priority, the network device further detects the existence of another first level key holder that is physically located closer to the current location of the wireless device (operation 560). Also, the network device will remove the security association information (e.g., PMKSA) for the wireless client from the initial first level key holder (operation 570). Thus, the wireless client will be forced to go through another initial mobility domain association (IMDA) with a network device which has been identified as the new first level key holder (i.e., a device near the wireless client's current location). Thereafter, this key holder will be selected as the appropriate first level key holder for the wireless client (operation 575).

On the other hand, if the third selecting rule is associated with the high priority, the network device may further identify all possible key holders that are capable of servicing as the appropriate first level key holder for the wireless client based on certain predefined criteria (operation 580). For example, these predefined criteria may include, but are not limited to, a maximum total number of wireless clients serviced by a possible key holder, and/or a current load on a possible key holder, etc. Moreover, upon identifying a subset of possible network devices, the third selecting rule facilitates the random selection of a network device from the subset of possible network devices as the appropriate first level key holder for the wireless client (operation 590).

Furthermore, if the fourth selecting rule is associated with the high priority, the network device may select the appropriate key holder for the wireless client based on the connectivity of the specific wireless client (operation 595). For example, the network device may select the wireless network device that the specific wireless client maintains an association with for a longer period of time compared to other wireless network devices.

Leveled Security Key Holder Determination System

Figure 6:
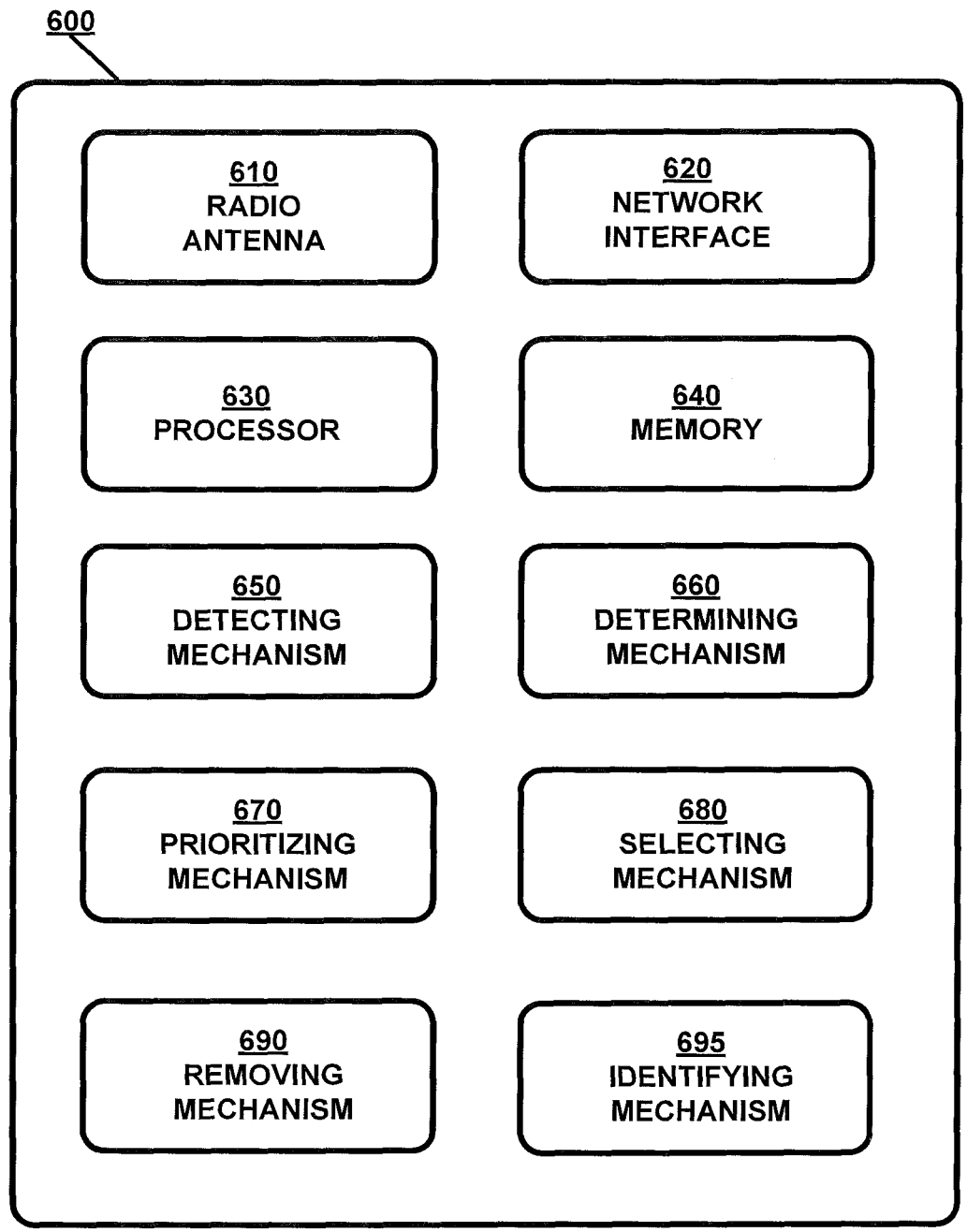
FIG. 6 is a block diagram illustrating a system for determining leveled security key holders according to embodiments of the present disclosure.

FIG. 6 is a block diagram illustrating a system for determining leveled security key holders for the specific wireless client according to embodiments of the present disclosure.

Operating as a node in a wireless digital network, network device 600 includes at least one or more radio antennas 610 capable of either transmitting or receiving radio signals or both, a network interface 620 capable of communicating to a wired or wireless network, a processor 630 capable of processing computing instructions, and a memory 640 capable of storing instructions and data. Moreover, network device 600 further includes a receiving mechanism 650, a transmitting mechanism 660, an assigning mechanism 670, and a detecting mechanism 680, 690, and 695, all of which are coupled to processor 630 and memory 640 in network device 600. Network device 600 may be used as a client system, or a server system, or may serve both as a client and a server in a distributed or a cloud computing environment.

Radio antenna 610 may be any combination of known or conventional electrical components for receipt of signaling, including but not limited to, transistors, capacitors, resistors, multiplexers, wiring, registers, diodes or any other electrical components known or later become known.

Network interface 620 can be any communication interface, which includes but is not limited to, a modem, token ring interface, Ethernet interface, wireless IEEE 802.11 interface, cellular wireless interface, satellite transmission interface, or any other interface for coupling network devices.

Processor 630 can include one or more microprocessors and/or network processors. Memory 640 can include storage components, such as, Dynamic Random Access Memory (DRAM), Static Random Access Memory (SRAM), etc.

Detecting mechanism 650 detects a roaming or connection pattern of one or more wireless clients in the wireless network based on requests received from the wireless clients. Furthermore, in some embodiments, detecting mechanism 650 also detects existence of a key holder near the current location of a specific wireless device and capable of servicing as the key holder for the specific wireless device.

Determining mechanism 660 determines one or more rules for selecting an appropriate key holder for the wireless client among a plurality of network devices. In some embodiments, the one or more selecting rules may include, but are not limited to, a first selecting rule based on an initial association of a specific wireless client with the wireless network, a second selecting rule based on a roaming or connection pattern of the specific wireless client, and a third selecting rule based on a random election among a plurality of network devices capable of servicing as the appropriate key holder for the specific wireless client.

According to embodiments of the present disclosure, prioritizing mechanism 670 prioritizes the selecting rules; and selecting mechanism 680 selects the appropriate key holder based on the determined rules and their corresponding priorities. Note that the selected appropriate key holder can store security association information (such as PMKSA) for a specific wireless client upon successful authentication to avoid re-authentication when the wireless client subsequently initiates a fast basic service set transition to another network device in the wireless network coupling to the appropriate key holder.

Moreover, determining mechanism 660, prioritizing mechanism 670, and selecting mechanism 680 operate in collaboration with each other. Specifically, in some embodiments, the first selecting rule is a default selecting rule. That is, a wireless network device near a location where the specific wireless client initially associate with the network (e.g., by initiating an Initial Mobility Domain Association (IMDA) request) will be selected by selecting mechanism 680 as the appropriate key holder for the specific wireless client.

In some embodiments, the second selecting rule based on the specific wireless client's roaming or connection pattern is associated with high priority when the specific wireless client spends more time near a second key holder than a first key holder based on the roaming or connection pattern. Moreover, the first key holder is near a first location at which the specific wireless client initiates association with the wireless network; and, the second key holder is located near a second and different location which is the current location of the specific wireless client. Furthermore, the second selecting rule facilitates selecting mechanism 680 to select the second key holder as the appropriate key holder for the specific wireless client.

In some embodiments, when the second selecting rule is associated with high priority, detecting mechanism 650 detects existence of the second key holder, which is located near the current location of the specific wireless client and which is capable of servicing as the key holder for the specific wireless client. Also, removing mechanism 690 removes cached security association information associated with the specific wireless client from the first key holder upon detecting mechanism 650 detects the existence of the second key holder.

In some embodiments, the third selecting rule, which is based on random selection of key holder among a plurality of network devices capable of servicing as the appropriate key holder for the wireless client, is associated with a high priority when a plurality of wireless clients initiating associations with the wireless network within a short time period.

In some embodiments, when the third selecting rule is associated with a high priority, identifying mechanism 695 identifies a subset of possible network devices from the plurality network devices capable of servicing as the appropriate key holder for the specific wireless client based on one or more of: a total number of wireless clients serviced by a respective network device, and/or a current load on the respective network device. Moreover, after identifying mechanism 695 identifies the subset of possible network devices, the third selecting rule facilitates selecting mechanism 680 to select a random network device from the subset of possible network devices as the appropriate key holder for the wireless client.

Hence, detecting mechanism 650, determining mechanism 660, prioritizing mechanism 670, selecting mechanism 680, removing mechanism 690, and identifying mechanism 695 collectively operate with each other to accomplish determination of leveled security key holders for wireless clients. Moreover, the above mechanisms may be operating with each other in the same or different software and/or hardware components.

According to embodiments of the present disclosure, network services provided by wireless network device 600, solely or in combination with other wireless network devices, include, but are not limited to, an Institute of Electrical and Electronics Engineers (IEEE) 802.1x authentication to an internal and/or external Remote Authentication Dial-In User Service (RADIUS) server; an MAC authentication to an internal and/or external RADIUS server; a built-in Dynamic Host Configuration Protocol (DHCP) service to assign wireless client devices IP addresses; an internal secured management interface; Layer-3 forwarding; Network Address Translation (NAT) service between the wireless network and a wired network coupled to the network device; an internal and/or external captive portal; an external management system for managing the network devices in the wireless network; etc.

The present disclosure may be realized in hardware, software, or a combination of hardware and software. The present disclosure may be realized in a centralized fashion in one computer system or in a distributed fashion where different elements are spread across several interconnected computer systems coupled to a network. A typical combination of hardware and software may be an access point with a computer program that, when being loaded and executed, controls the device such that it carries out the methods described herein.

The present disclosure also may be embedded in non-transitory fashion in a computer-readable storage medium (e.g., a programmable circuit; a semiconductor memory such as a volatile memory such as random access memory "RAM," or non-volatile memory such as read-only memory, power-backed RAM, flash memory, phase-change memory or the like; a hard disk drive; an optical disc drive; or any connector for receiving a portable memory device such as a Universal Serial Bus "USB" flash drive), which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

As used herein, "network device" generally includes a device that is adapted to transmit and/or receive signaling and to process information within such signaling such as a station (e.g., any data processing equipment such as a computer, cellular phone, personal digital assistant, tablet devices, etc.), an access point, data transfer devices (such as network switches, routers, controllers, etc.) or the like.

As used herein, the term "interconnect" or used descriptively as "interconnected" is generally defined as a communication pathway established over an information-carrying medium. The "interconnect" may be a wired interconnect, wherein the medium is a physical medium (e.g., electrical wire, optical fiber, cable, bus traces, etc.), a wireless interconnect (e.g., air in combination with wireless signaling technology) or a combination of these technologies.

As used herein, "information" is generally defined as data, address, control, management (e.g., statistics) or any combination thereof. For transmission, information may be transmitted as a message, namely a collection of bits in a predetermined format. One type of message, namely a wireless message, includes a header and payload data having a predetermined number of bits of information. The wireless message may be placed in a format as one or more packets, frames or cells.

As used herein, "access point" (AP) generally refers to receiving points for any known or convenient wireless access technology which may later become known. Specifically, the term AP is not intended to be limited to IEEE 802.11-based APs. APs generally function to allow wireless devices to connect to a wired network via various communications standards.

As used herein, "wireless local area network" (WLAN) generally refers to a communications network links two or more devices using some wireless distribution method (for example, spread-spectrum or orthogonal frequency-division multiplexing radio), and usually providing a connection through an access point to the Internet; and thus, providing users with the mobility to move around within a local coverage area and still stay connected to the network.

As used herein, the term "mechanism" generally refers to a component of a system or device to serve one or more functions, including but not limited to, software components, electronic components, mechanical components, electro-mechanical components, etc.

As used herein, the term "embodiment" generally refers an embodiment that serves to illustrate by way of example but not limitation.

It will be appreciated to those skilled in the art that the preceding examples and embodiments are exemplary and not limiting to the scope of the present disclosure. It is intended that all permutations, enhancements, equivalents, and improvements thereto that are apparent to those skilled in the art upon a reading of the specification and a study of the drawings are included within the true spirit and scope of the present disclosure. It is therefore intended that the following appended claims include all such modifications, permutations and equivalents as fall within the true spirit and scope of the present disclosure.

While the present disclosure has been described in terms of various embodiments, the present disclosure should not be limited to only those embodiments described, but can be practiced with modification and alteration within the spirit and scope of the appended claims. Likewise, where a reference to a standard is made in the present disclosure, the reference is generally made to the current version of the standard as applicable to the disclosed technology area. However, the described embodiments may be practiced under subsequent development of the standard within the spirit and scope of the description and appended claims. The description is thus to be regarded as illustrative rather than limiting.

What is claimed is:

1. A method comprising:
   detecting, by a network device in a wireless network, a roaming or connection pattern of one or more wireless clients in the wireless network based on requests received from the wireless clients;
   prioritizing two or more of: (1) a first selecting rule based on an initial association of a particular wireless client with the wireless network; (2) a second selecting rule based on at least one of a roaming pattern and a connection pattern of the particular wireless client; (3) a third selecting rule based on a random election among a plurality of network devices capable of servicing as the appropriate key holder for the particular wireless client; or (4) a fourth selecting rule based on connectivity of the particular wireless client; and
   selecting a key holder for storing a second level key for a particular wireless client among a plurality of network devices based on prioritized rules, wherein the second level key is derived from a first level key which is derived from a pre-configured key, and wherein the second level key is used to generate a derived security key for authenticating the particular wireless client.

2. The method of claim 1, wherein the selected key holder stores security association information for the wireless client upon successful authentication to avoid re-authentication when the wireless client subsequently initiates a fast basic service set transition to another network device in the wireless network coupling to the appropriate key holder.

3. The method of claim 1, wherein the pre-configured key comprises one or more of a master session key received from an authentication server and a pre-shared key pre-established between the wireless client and the wireless network.

4. The method of claim 1, wherein the derived security key comprises a pairwise transient key used for authentication of the wireless client in a fast basic service set transition.

5. The method of claim 1,
   wherein the second selecting rule is associated with high priority in response to the specific wireless client spending more time near a second key holder than a first key holder based on at least one of the roaming pattern and a connection pattern;
   wherein the first key holder is near a first location at which the specific wireless client initiates association with the wireless network;
   wherein the second key holder is located near a second location different from the first location, the second location being the current location of the specific wireless client; and
   wherein selecting the key holder comprises selecting the second key holder as the key holder for the wireless client.

6. The method of claim 1, further comprising:
   detecting existence of the second key holder near the current location of the specific wireless client;
   detecting a capability of the second key holder, wherein the capability comprising serving as the key holder for the specific wireless client; and
   removing cached security association information associated with the specific wireless client from the first key holder in response to detecting the existence of the second key holder.

7. The method of claim 1,
   wherein the plurality of network devices are capable of serving as the key holder for a plurality of wireless clients including the specific wireless client; and
   wherein the third selecting rule is associated with high priority in response to the plurality of wireless clients initiating association with the wireless network within a predetermined time period.

8. The method of claim 7, further comprising:
   identifying a subset of possible network devices from the plurality network devices capable of serving as the key holder for the specific wireless client based on one or more of:
   a total number of wireless clients serviced by a respective network device, and
   a current load on the respective network device.

9. The method of claim 8, wherein selecting the key holder comprises selecting a random key holder among the subset of possible network devices capable of serving as the appropriate key holder for the specific client.

10. A network device comprising:
    a processor;
    a memory;
    a detecting mechanism operating with the processor, the detecting mechanism to detect a roaming or connection pattern of one or more wireless clients in the wireless network based on requests received from the wireless clients;
    a prioritizing mechanism operating with the processor, the prioritizing mechanism prioritizing two or more of: (1) a first selecting rule based on an initial association of a particular wireless client with the wireless network; (2) a second selecting rule based on at least one of a roaming pattern and a connection pattern of the particular wireless client; (3) a third selecting rule based on a random election among a plurality of network devices capable of servicing as the appropriate key holder for the particular wireless client; or (4) a fourth selecting rule based on connectivity of the particular wireless client; and
    a selecting mechanism operating with the processor, the selecting mechanism selecting a key holder for storing a second level key for a particular wireless client among a plurality of network devices based on prioritized rules, wherein the second level key is derived from a first level key which is derived from a pre-configured key, and wherein the second level key is used to generate a derived security key for authenticating the particular wireless client.

11. The network device of claim 10, wherein the selected key holder stores security association information for the wireless client upon successful authentication to avoid re-authentication when the wireless client subsequently initiates a fast basic service set transition to another network device in the wireless network coupling to the appropriate key holder.

12. The network device of claim 10, wherein the pre-configured key comprises one or more of a master session key received from an authentication server and a pre-shared key pre-established between the wireless client and the wireless network.

13. The network device of claim 10, wherein the derived security key comprises a pairwise transient key used for authentication of the wireless client in a fast basic service set transition.

14. The network device of claim 10,
wherein the second selecting rule is associated with high priority in response to the specific wireless client spending more time near a second key holder than a first key holder based on at least one of the roaming pattern and a connection pattern;
wherein the first key holder is near a first location at which the specific wireless client initiates association with the wireless network;
wherein the second key holder is located near a second location different from the first location, the second location being the current location of the specific wireless client; and
wherein selecting the key holder comprises selecting the second key holder as the key holder for the wireless client.

15. The network device of claim 10,
wherein the detecting mechanism further to detect existence of the second key holder near the current location of the specific wireless client, and to detect a capability of the second key holder, the capability comprising serving as the key holder for the specific wireless client; and
wherein the network device further comprises a removing mechanism operating with the processor, the removing mechanism to remove cached security association information associated with the specific wireless client from the first key holder in response to the detecting mechanism detects the existence of the second key holder.

16. The network device of claim 10,
wherein the plurality of network devices are capable of serving as the key holder for a plurality of wireless clients including the specific wireless client; and
wherein the third selecting rule is associated with high priority in response to the plurality of wireless clients initiating association with the wireless network within a predetermined time period.

17. The network device of claim 16, further comprising an identifying mechanism operating with the processor, the identifying mechanism to identify a subset of possible network devices from the plurality network devices capable of serving as the key holder for the specific wireless client based on one or more of:
a total number of wireless clients serviced by a respective network device, and
a current load on the respective network device.

18. The network device of claim 17, wherein the selecting mechanism selects a random key holder among the subset of possible network devices capable of serving as the key holder for the specific client.

19. A non-transitory computer-readable storage medium storing embedded instructions that are executed by one or more mechanisms implemented within a network device to perform a plurality of operations comprising:
detecting a roaming or connection pattern of one or more wireless clients in a wireless network based on requests received from the wireless clients;
prioritizing two or more of: (1) a first selecting rule based on an initial association of a particular wireless client with the wireless network; (2) a second selecting rule based on at least one of a roaming pattern and a connection pattern of the particular wireless client; (3) a third selecting rule based on a random election among a plurality of network devices capable of servicing as the appropriate key holder for the particular wireless client; or (4) a fourth selecting rule based on connectivity of the particular wireless client; and
selecting a key holder for storing a second level key for a particular wireless client among a plurality of network devices based on prioritized rules, wherein the second level key is derived from a first level key which is derived from a pre-configured key, and wherein the second level key is used to generate a derived security key for authenticating the particular wireless client.

* * * * *

UNITED STATES PATENT AND TRADEMARK OFFICE
CERTIFICATE OF CORRECTION

| | | |
|---|---|---|
| PATENT NO. | : 9,084,111 B2 | Page 1 of 1 |
| APPLICATION NO. | : 13/368212 | |
| DATED | : July 14, 2015 | |
| INVENTOR(S) | : Partha Narasimhan et al. | |

It is certified that error appears in the above-identified patent and that said Letters Patent is hereby corrected as shown below:

Drawings

In sheet 1 of 9, reference numeral 100, line 1, delete "DISTRIBUTEION" and insert
-- DISTRIBUTION --, therefor.

In sheet 8 of 9, reference numeral 550, line 8, delete "ASSICIATION" and insert
-- ASSOCIATION --, therefor.

Signed and Sealed this
Ninth Day of February, 2016

Michelle K. Lee
*Director of the United States Patent and Trademark Office*